(12) United States Patent
Rapipour et al.

(10) Patent No.: US 7,619,994 B2
(45) Date of Patent: *Nov. 17, 2009

(54) ADAPTER FOR USE WITH A TANDEM-FREE CONFERENCE BRIDGE

(75) Inventors: Rafi Rapipour, Côte St-Luc (CA); Paul Coverdale, Nepean (CA)

(73) Assignee: Nortel Networks Limited, St-Laurent, Quebec (CA)

(*) Notice: Subject to any disclaimer, the term of this patent is extended or adjusted under 35 U.S.C. 154(b) by 1069 days.

This patent is subject to a terminal disclaimer.

(21) Appl. No.: 10/721,909

(22) Filed: Nov. 26, 2003

(65) Prior Publication Data

US 2005/0114433 A1   May 26, 2005

(51) Int. Cl.
  *H04L 12/16* (2006.01)
(52) U.S. Cl. .................. 370/260; 370/267; 370/521; 379/202.01; 455/416; 709/203
(58) Field of Classification Search ................ 370/389, 370/536, 260, 267, 521; 382/219; 380/37; 379/202.01; 455/416; 709/203
See application file for complete search history.

(56) References Cited

U.S. PATENT DOCUMENTS

| | | | | |
|---|---|---|---|---|
| 5,436,896 A | * | 7/1995 | Anderson et al. | 370/260 |
| 5,526,354 A | * | 6/1996 | Barraclough et al. | 370/260 |
| 5,530,699 A | * | 6/1996 | Kline | 370/260 |
| 6,205,140 B1 | * | 3/2001 | Putzolu et al. | 370/389 |
| 6,535,530 B1 | * | 3/2003 | Matsui | 370/536 |
| 6,940,826 B1 | * | 9/2005 | Simard et al. | 370/260 |
| 7,149,359 B1 | * | 12/2006 | Omoigui | 382/219 |
| 7,254,605 B1 | * | 8/2007 | Strum | 709/203 |
| 7,483,400 B2 | * | 1/2009 | Kuusinen et al. | 370/267 |
| 2002/0141354 A1 | * | 10/2002 | Niiya et al. | 370/260 |
| 2005/0002525 A1 | * | 1/2005 | Alkove et al. | 380/37 |

OTHER PUBLICATIONS

P.J. Smith et al.: "Speaker Selection for Tandem-Free Operation VoIP Conference Bridges", Proc. of the IEEE Workshop on Speech Coding (Tsukuba, Japan), Oct. 2002.
P.J. Smith et al.: "Tandem-Free VoIP Conferencing: A Bridge to Next Generation Networks", IEEE Communications Magazine, May 2003.
P.J. Smith et al.: "Tandem Free Operation for VoIP Conference Bridges", Proc. of the IEEE Int. Conf. on Communications (Anchorage, Alaska, U.S.A.), May 2003.

* cited by examiner

*Primary Examiner*—Gerald Gauthier (57) ABSTRACT

A conference bridge adapter for processing data carried on a media path between, on the one hand, a conference bridge operative to communicate composite packets carrying media information and auxiliary information pertaining to the media information and, on the other hand, an endpoint characterized by an inability to exchange composite packets with the conference bridge. In one direction, a stream of composite packets is received from the bridge. An output media stream without auxiliary information is generated from the media information in each received composite packet. In the opposite direction, a stream of packets carrying only media information is received from the endpoint. Auxiliary information is derived from the media information and a stream of composite packets is generated by combining the media information and the auxiliary information. Thus, a media conference can be established between seemingly incompatible network elements.

58 Claims, 5 Drawing Sheets

FIG. 3C

ADAPTER FOR USE WITH A TANDEM-FREE CONFERENCE BRIDGE

FIELD OF THE INVENTION

The present invention relates in general to teleconferencing systems and, more particularly, to an adapter for use with a conference bridge that is capable of operating on compressed speech packets.

BACKGROUND OF THE INVENTION

In the interest of bandwidth economy, technologies have been developed to enable the transmission of compressed speech between media gateways in a network. Specifically, upon receipt of a speech signal from an end user, a media gateway encodes (or "compresses") the speech and sends the compressed speech to a remote media gateway in the network in the form of a compressed speech packet. At the remote gateway, the compressed speech is decoded (or "decompressed") into a speech signal and sent to an end user telephony device over a communication link, typically in a pulse coded modulation (PCM) format. The transmission of compressed speech between media gateways results in bandwidth economy.

In order to provide conferencing functionality, it is possible to introduce a device known as a "conference bridge" into the above scenario. However, a conventional conference bridge operates on decompressed speech signals, which leads to various disadvantages. Specifically, the introduction of a conventional conference bridge between media gateways requires an extra decompression stage at each input to the conference bridge followed by an extra stage of compression at each output of the conferencing bridge. This is known as "tandem" operation of speech codecs caused by the use of a conventional conference bridge. The "tandem" operation of speech codecs described above induces a loss of perceived signal quality, as well as an increase in required processing power.

Therefore, as an improvement, the concept of a "tandem-free" conference bridge has been introduced. As described in, for example, published U.S. patent application Ser. No. 09/986,498 to Rabipour et al., filed on Nov. 9, 2001, published on Aug. 8, 2002, hereby incorporated by reference herein, and the references cited therein, the tandem-free conference bridge makes forwarding decisions on the basis of "auxiliary information" received together with compressed speech for each media stream. Because of the presence of auxiliary information, the tandem-free bridge need not actually decode the compressed speech, hence resulting in an improvement in end-to-end speech quality.

The reader may also find it useful to consult other references that describe tandem-free bridge capabilities, including U.S. patent application Ser. No. 09/475,047 entitled "Apparatus and Method for Packet-Based Media Communications" filed on Dec. 30, 1999; U.S. patent application Ser. No. 09/750,015 entitled "Apparatus and Method for Packet-Based Media Communications." filed on Dec. 29, 2000, published on Jul. 4, 2002; and U.S. patent application Ser. No. 09/664,450 entitled "Apparatus and Method for Packet-Based Media Communications" filed on Sep. 18, 2000. The contents of each of these references is incorporated by reference herein.

However, conventional media gateways do not possess the additional ability to provide the auxiliary information expected by the tandem-free conference bridge, nor the additional ability to process the auxiliary information received from the tandem-free conference bridge.

One solution would be to provision all new media gateways with suitable hardware and/or software for tandem-free bridge compatibility in order to cover the eventuality of the media gateway participating in a conference call through a tandem-free bridge. However, this solution does not take into consideration the large number of media gateways that have already been deployed without the ability to generate or process auxiliary information. For these media gateways, an upgrade would now be required to render them compatible with a tandem-free conference bridge. This solution is both costly and inefficient. Moreover, some outdated equipment may not even be amenable to upgrades.

Against this background, it is clear that there is a need in the industry for an improved solution to allow media gateways to participate in a conference with a conference bridge that operates on compressed speech in a tandem-free mode, such that conferencing services can be introduced gradually and without a wholesale upgrade of deployed gateways.

SUMMARY OF THE INVENTION

A first broad aspect of the present invention seeks to provide a method of processing data carried on a media path between a first network element and a second network element. The method comprises receiving a stream of composite packets from the first network element, each composite packet carrying media information and auxiliary information pertaining to the composite packet. The method further comprises generating, on a basis of the media information and the auxiliary information carried in the composite packets, an output media stream free of the auxiliary information carried in the composite packets. The method also comprises releasing the output media stream towards the second network element.

A second broad aspect of the present invention seeks to provide an apparatus for processing data carried on a media path between a first network element and a second network element. The apparatus comprises means for receiving a stream of composite packets from the first network element, each composite packet carrying media information and auxiliary information pertaining to the composite packet. The apparatus also comprises means for generating, on a basis of the media information and the auxiliary information carried in the composite packets, an output media stream free of the auxiliary information carried in the composite packets. The apparatus further comprises means for releasing the output media stream towards the second network element.

A third broad aspect of the present invention seeks to provide an apparatus for processing data carried on a media path between a first network element and a second network element. The apparatus comprises a data interface operative to receive a stream of composite packets from the first network element and to release an output media stream towards the second network element, each composite packet carrying media information and auxiliary information pertaining to the composite packet. The apparatus further comprises a processing entity operative to generate, on a basis of the media information and the auxiliary information carried in the composite packets, the output media stream free of the auxiliary information carried in the composite packets.

A fourth broad aspect of the present invention seeks to provide a computer program product for use with a conference bridge adapter located in a media path between a first data element and a second data element, the computer program product comprising a computer usable medium having computer readable program code thereon. The computer readable program code includes program code for receiving a stream of composite packets from the first network element, each composite packet carrying media information and auxiliary information pertaining to the composite packet. The computer readable program code also includes program code for generating, on a basis of the media information and the auxiliary information carried in the composite packets, an output media stream free of the auxiliary information carried in the composite packets. The computer readable program code further includes program code for releasing the output media stream towards the second network element.

A fifth broad aspect of the present invention seeks to provide a method of processing data carried on a media path between a first network element and a second network element. The method comprises receiving a stream of packets from the first network element, each received packet carrying media information, deriving from the media information carried in each received packet auxiliary information pertaining to the received packet, generating a stream of composite packets, each said composite packet being produced from the media information carried in a respective received packet and the auxiliary information pertaining to the respective received packet and releasing the stream of composite packets towards the second network element.

A sixth broad aspect of the present invention seeks to provide an apparatus for processing data carried on a media path between a first network element and a second network element. The apparatus comprises means for receiving a stream of packets from the first network element, each received packet carrying media information, means for deriving from the media information carried in each received packet auxiliary information pertaining to the received packet, means for generating a stream of composite packets, each said composite packet being produced from the media information carried in a respective received packet and the auxiliary information pertaining to the respective received packet and means for releasing the stream of composite packets towards the second network element.

A seventh broad aspect of the present invention seeks to provide an apparatus for processing data carried on a media path between a first network element and a second network element. The apparatus comprises a data interface operative to receive a stream of packets from the first network element and to release a stream of composite packets towards the second network element, each received packet carrying media information, a processing entity operative to derive from the media information carried in each received packet auxiliary information pertaining to the received packet, and a combiner operative to produce each composite packet by combining the media information carried in a respective received packet and the auxiliary information pertaining to the respective received packet.

An eighth broad aspect of the present invention seeks to provide a computer program product for use with a conference bridge adapter located in a media path between a first data element and a second data element, the computer program product comprising a computer usable medium having computer readable program code thereon. The computer readable program code includes program code for receiving a stream of packets from the first network element, each received packet carrying media information, program code for deriving from the media information carried in each received packet auxiliary information pertaining to the received packet, program code for generating a stream of composite packets, each said composite packet being produced from the media information carried in a respective received packet and the auxiliary information pertaining to the respective received packet and program code for releasing the stream of composite packets towards the second network element.

A ninth broad aspect of the present invention seeks to provide a method of establishing a media conference linking a plurality of endpoints via a conference bridge adapted to exchange composite packets carrying media information in conjunction with auxiliary information pertaining to the media information. The method comprises (a) determining whether one or more of the endpoints is characterized by an inability to exchange composite packets with the conference bridge and (b) for at least one endpoint identified at a), routing the media path from said endpoint via an adapter that is capable of exchanging composite packets with the conference bridge.

A tenth broad aspect of the present invention seeks to provide a teleconferencing network. The network comprises a conference bridge operative to communicate composite packets carrying media information in conjunction with auxiliary information pertaining to the media information, a plurality of conference endpoints, at least one of which is characterized by an inability to exchange the composite packets with the conference bridge and a bridge adapter located between the conference bridge and at least one endpoint characterized by an inability to exchange composite packets with the conference bridge, the adapter being operative to exchange composite packets with the conference bridge.

The invention may be embodied in a processor readable medium containing a software program comprising instructions for a processor to implement any of the above described methods.

It should be appreciated that the word "packet" as used herein should be construed broadly as encompassing any datagram format, including but not limited to Internet Protocol (IP), Asynchronous Transfer Mode (ATM), Ethernet, Frame Relay, etc.

These and other aspects and features of the present invention will now become apparent to those of ordinary skill in the art upon review of the following description of specific embodiments of the invention in conjunction with the accompanying drawings.

DETAILED DESCRIPTION OF THE EMBODIMENTS

Figure 1:
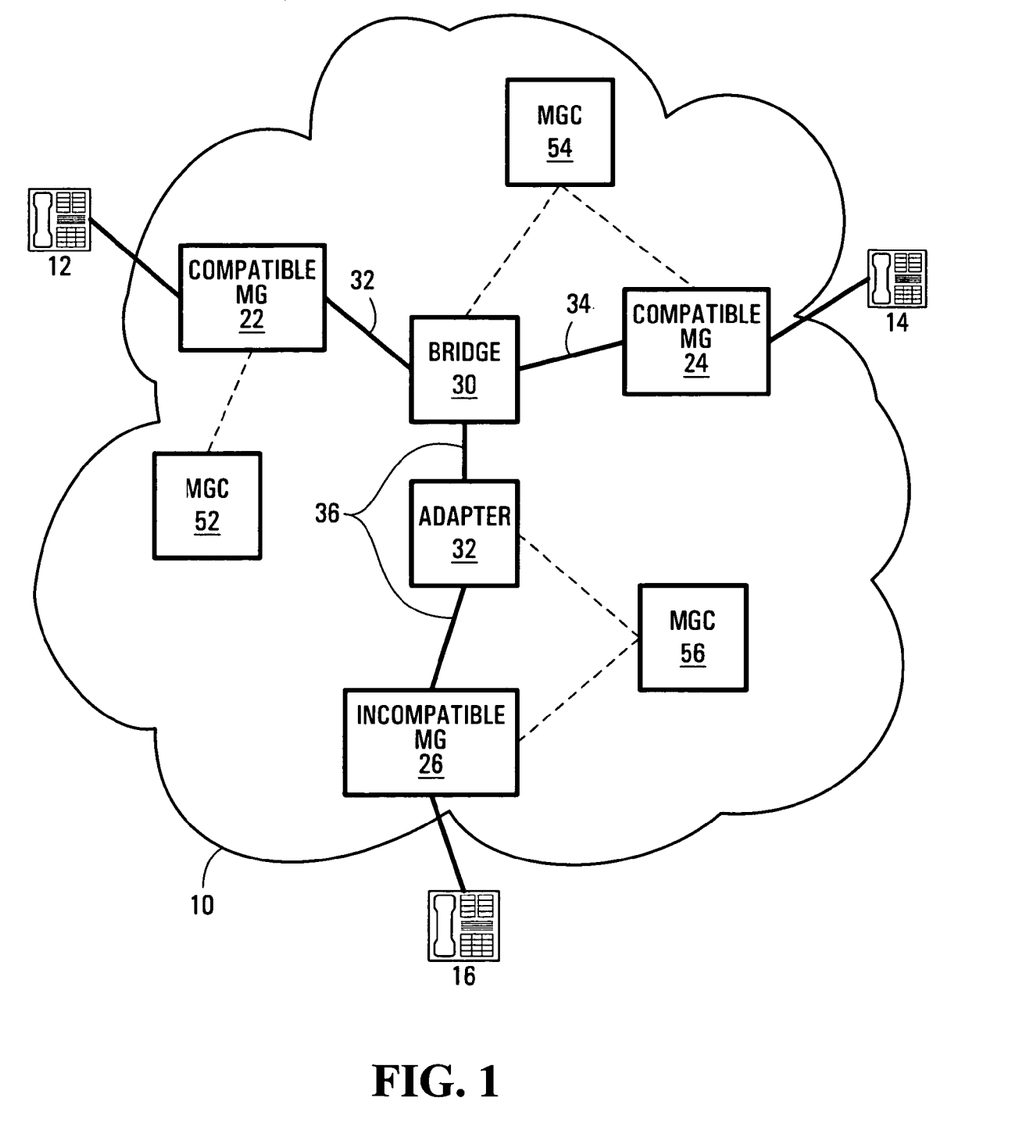
FIG. 1 is a block diagram showing a tandem-free conference bridge and a bridge adapter involved in a three-way teleconference.

FIG. 1 shows a communications architecture in which a plurality of end user devices 12, 14, 16 are desirous of participating in a teleconference across a network 10. Examples of end user devices 12, 14, 16 are telephony devices such as telephones. The end user devices 12, 14, 16 communicate with respective media gateways 22, 24, 26 via wireless or wireline links. The media gateways 22, 24, 26 are connected to one another via links and nodes of the network 10.

The network 10 also includes a tandem-free conference bridge 30 that is capable of establishing an N-way conference (in the present non-limiting specific example, N=3) on the basis of N received data streams. In such an arrangement, each received data stream comprises packets that carry compressed speech for a given time interval. Each packet in the received data stream also comprises auxiliary information, which may include one or more of: signal level information for the corresponding time interval, speech segment classification information (e.g., onset, sustained, offset, pause, and silence-identification), signal segment descriptors, signal power, a codec type, a speaker tag (identity of conference participant) or any other data element characterising the media information from which the compressed speech was derived.

Generally speaking, one purpose of a tandem-free conference bridge, such as tandem-free bridge 30, is to perform speaker selection, i.e., to select M from amongst the N streams to deliver to each of the conference participants. The M selected streams are said to belong to "active" speakers. Typically, M is set to 2 or 3, depending on factors such as the desired level of transparency of the speaker selection, per link bandwidth, signal-to-noise considerations, endpoint processing power and so on. Speaker selection is performed on the basis of the auxiliary information. For example, since the bridge has knowledge of the signal power of each media stream, it can make a voice activity detector (VAD) decision and/or rank speakers based on how loudly they are talking. For more information regarding the manner in which speaker selection may be performed, the reader is referred to published U.S. patent application Ser. No. 09/986,498 to Rabipour et al., filed on Nov. 9, 2001, and the references referred to therein, the contents of which are incorporated by reference herein.

The compressed speech from the M selected streams is forwarded towards each participant's media gateway. In addition, some or all of the auxiliary information pertaining to the compressed speech is also forwarded towards each participant's media gateway. For instance, the auxiliary information forwarded to the media gateway may include the speaker tag and/or codec type. The speaker tag can be used by the media gateway to maintain a separate synthesis stream, while the codec type can be useful to select the most appropriate vocoder in cases where several codecs are used concurrently (e.g. wideband and narrowband).

Thus, it will be appreciated that a full speech decoding process is not required at a tandem-free conference bridge since the information needed to carry out decisions is explicitly carried in each media stream by virtue of the auxiliary information. In this way, tandem speech decoding and re-encoding is avoided at the conference bridge, hence the term "tandem-free conference bridge". The avoidance of tandem encoding and decoding operations in the network tends to improve the perceived quality of the synthesized speech.

Returning now to FIG. 1, media gateways 22, 24 are connected to the tandem-free conference bridge 30 by respective media paths 32, 34. For the purposes of the example being described here in relation to FIG. 1, media gateways 22, 24 are assumed to be "compatible" with the tandem-free conference bridge 30. That is to say, in one direction of communication, each of the media gateways 22, 24 is adapted to provide the tandem-free conference bridge 30 with "composite" packets. Each of the composite packets carries compressed speech representative of speech originated by the respective end user device 12, 14 in a given time interval. Each of the composite packets also carries auxiliary information pertaining to the compressed speech carried in the composite packet.

In the opposite direction of communication, each of the media gateways 22, 24 is adapted to synthesize a speech signal for the respective end user device 12, 14, based on M streams of composite packets received from the tandem-free conference bridge 30. Each such composite packet carries compressed speech for a given time interval and auxiliary information pertaining to the compressed speech carried in the packet. Since M selected streams are received from the tandem-free conference bridge 30, there will be up to M compressed speech packets received by each of the media gateways 22, 24 for each time interval, corresponding to the M active speakers.

For its part, media gateway 26 is connected to the tandem-free conference bridge 30 by a media path 36. For the purposes of the example being described here in relation to FIG. 1, media gateway 26 is assumed to be incompatible with the tandem-free conference bridge 30. That is to say, in one direction of communication, media gateway 26 produces packets containing compressed speech or uncompressed speech (i.e., waveform data) representative of speech originated by the end user device 16, without any auxiliary information, for transmission into the network 10. In the opposite direction of communication, media gateway 26 expects to receive packets containing compressed speech or uncompressed speech (i.e., waveform data) from at most one speaker at a time, for synthesis and transmission to the end user device 16. The media gateway 26 is characterized by an inability to process auxiliary information that forms part of the composite packets sent by the tandem-free conference bridge 30.

In order to allow the tandem-free conference bridge 30 to nevertheless serve as a bridge for a teleconference involving media gateways 22, 24 and 26 (i.e., including both compatible and incompatible media gateways), the network 10 comprises a bridge adapter 32 (hereinafter simply referred to as "adapter" 32) through which the media path 36 between the media gateway 26 and the tandem-free conference bridge 30 is routed. The routing of the media path 36 through the adapter 32 can be achieved during call setup, for example.

Figure 3A:
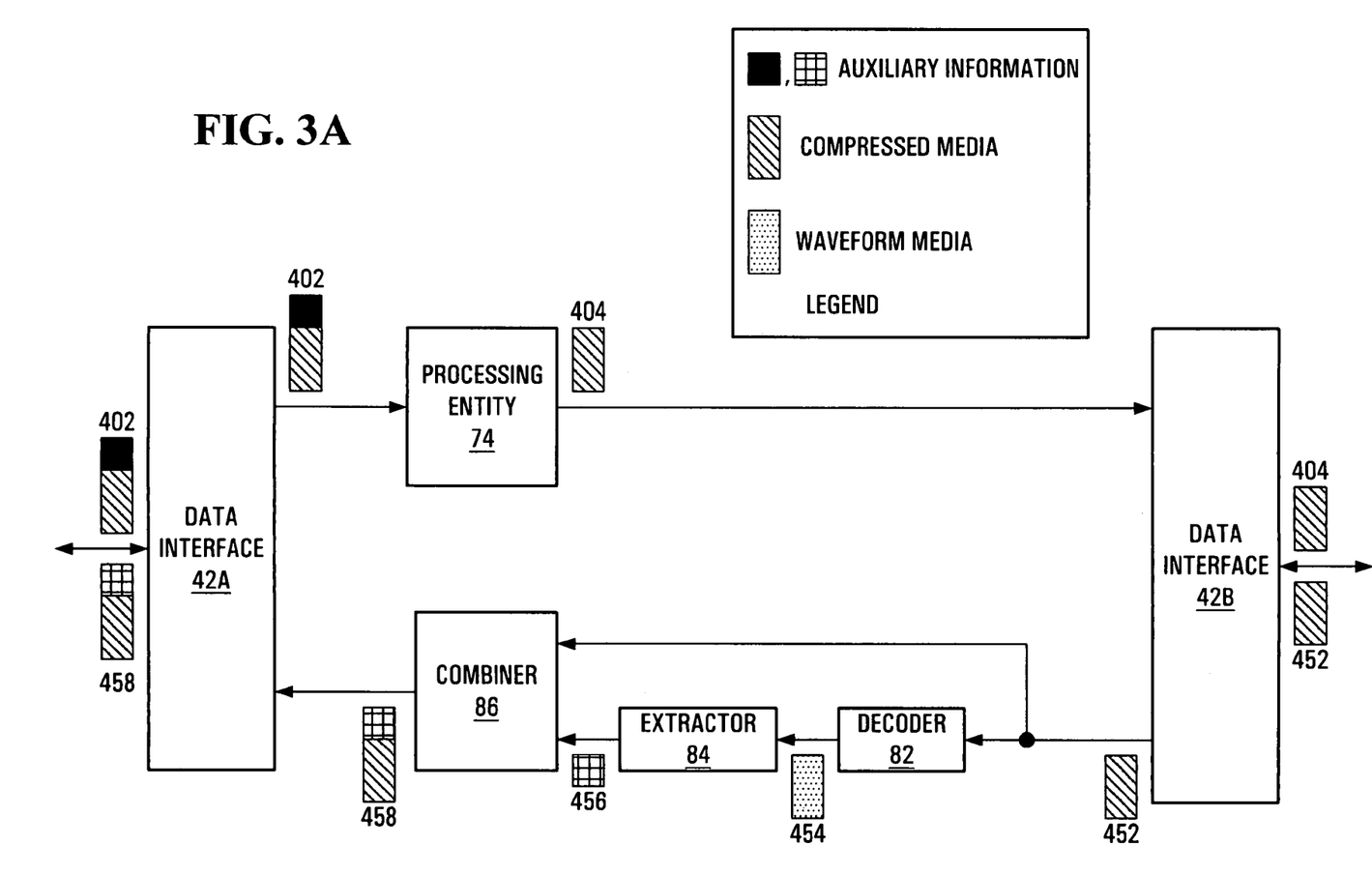
FIGS. 3A to 3C are schematic block diagrams of the bridge adapter in accordance with embodiments of the present invention.

A first embodiment of the adapter 32 is shown in FIG. 3A, wherein there is only a single active speaker (i.e., M=1). The adapter 32 is seen to comprise a data interface 42A for exchanging data with the tandem-free conference bridge 30 and a data interface 42B for exchanging data with the media gateway 26. Specifically, the data received from the tandem-free conference bridge 30 comprises composite packets 402 containing compressed speech and auxiliary information pertaining to the compressed speech in each of the composite packets 402. In the present example, the auxiliary information includes a speaker tag indicative of a selected speaker, in this case "12" being indicative of end user device 12. As mentioned before, the auxiliary information may include different information instead of, or in addition to, the speaker tag. The data interface 42A forwards the composite packets 402 to a processing entity 74. The processing entity 74 is adapted to remove the auxiliary information from the composite packets 402 and process it if necessary. In the present example, there is only one active speaker, and therefore the function of the processing entity 74 may be as simple as the mere removal of the auxiliary information, resulting in compressed speech packets 404 being fed to the data interface 42B. The data interface 42B accordingly provides the compressed speech packets 404 to the media gateway 26.

In the reverse direction of communication, the data received from the media gateway 26 at the data interface 42B comprises compressed speech packets 452. The data interface 42B forwards the compressed speech packets 452 to a decoder 82, which converts the compressed speech packets into uncompressed speech packets 454 (i.e., waveform data such as PCM samples). The uncompressed speech packets 454 are fed to an auxiliary information extractor 84 (hereinafter referred to simply as "extractor 84"), which processes the uncompressed speech packets 454 to extract auxiliary information 456 therefrom. The extracted auxiliary information can be referred to as auxiliary information. In the present example, the auxiliary information 456 includes a signal power, which can be measured from the uncompressed speech packets 454 by a signal power measurement unit forming part of the extractor 84. The auxiliary information 456 may also include a speaker tag, which identifies the end user device 16 from which the speech in the uncompressed speech packets 454 originated. This may be obtained on the basis of a source address of the compressed speech packets 452. The extractor 84 provides the auxiliary information 456 to a combiner 86, which also receives the compressed speech packets 452 from the data interface 42B. The combiner 82 associates (e.g., appends, concatenates, etc.) the auxiliary information 456 to the compressed speech packets 452 to create composite packets 458 that are fed to the data interface 42A. The data interface 42A accordingly forwards the composite speech packets 458 to the tandem-free conference bridge 30.

Figure 3B:
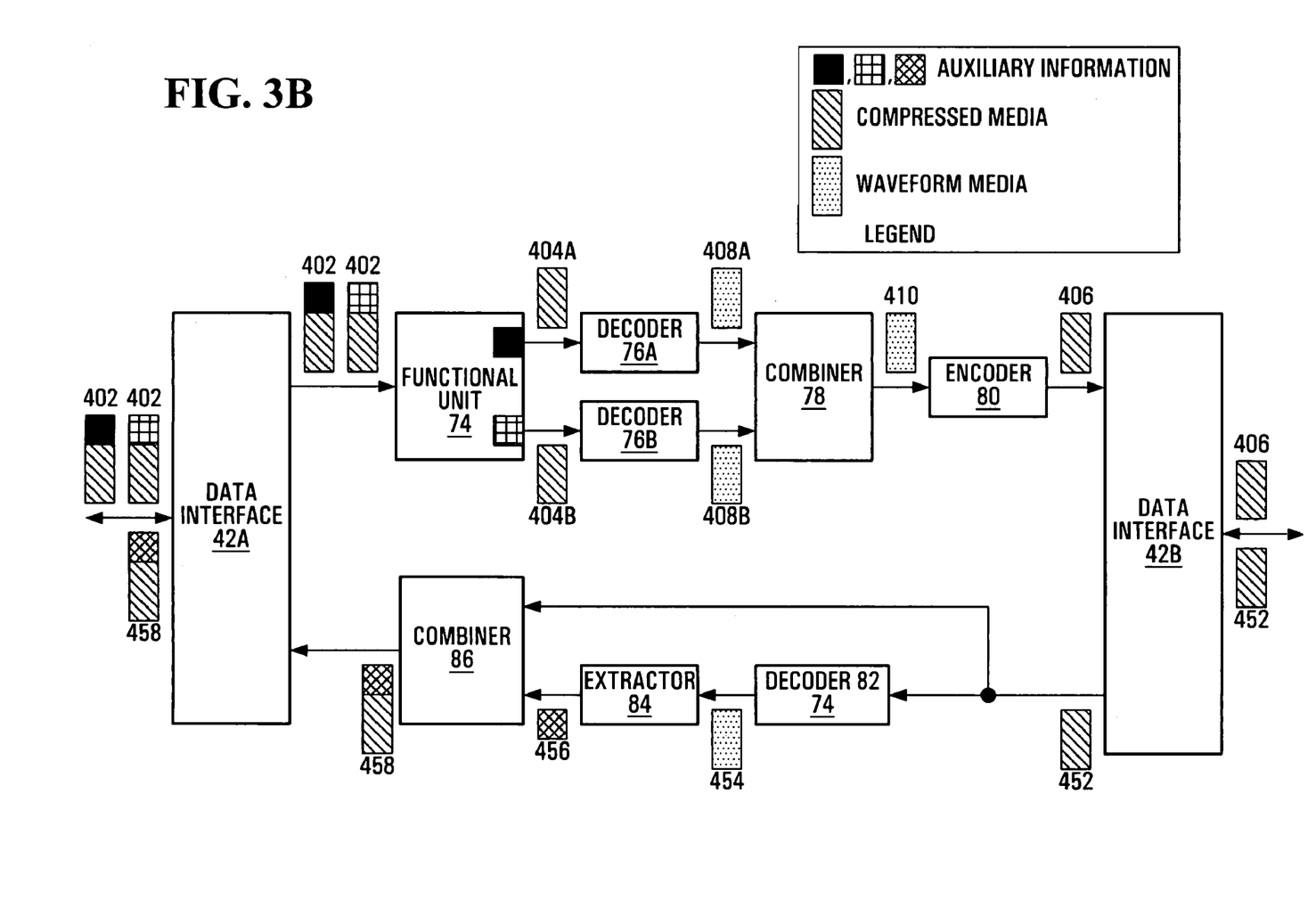

A second embodiment of the adapter 32 is shown in FIG. 3B, wherein there are two active speakers (i.e., M=2). The adapter 32 is seen to comprise a data interface 42A for exchanging data with the tandem-free conference bridge 30 and a data interface 42B for exchanging data with the media gateway 26. Specifically, the data received from the tandem-free conference bridge 30 comprises composite packets 402 containing compressed speech and auxiliary information pertaining to the compressed speech in each of the composite packets 402. In the present example, the auxiliary information includes a speaker tag indicative of a selected speaker, either "12" being indicative of end user device 12 or "14" being indicative of end user device 14. As mentioned before, the auxiliary information may include different information instead of, or in addition to, the speaker tag. The data interface 42A forwards the composite packets 402 to a processing entity 74.

The processing entity 74 is adapted to remove the auxiliary information from the composite packets 402 and process it if necessary. In the present example, there are two active speakers, and therefore the function of the processing entity 74 may be as simple as the sorting of the composite packets 402 into one of two streams of compressed speech packets 404A, 404B, based on the speaker identified in the auxiliary information. In another embodiment, the processing entity 74 may determine a vocoder type from the auxiliary information, which may indicate that the two streams of compressed speech packets 404A, 404B have been compressed using different vocoder rates or algorithms, for example.

The two streams of compressed speech packets 404A, 404B are fed to respective decoders 76A, 76B. Decoder 76A converts the speech in the respective stream of compressed speech packets 404A into a stream of uncompressed speech packets 408A (e.g., waveform data such as PCM samples). Similarly, decoder 76B converts the speech in the respective stream of compressed speech packets 404B into a stream of uncompressed speech packets 408B (e.g., waveform data such as PCM samples). It is recalled that the processing entity 74 may indicate to each of the decoders 76A, 76B that it is to use a different rate or algorithm, for example. The uncompressed speech packets 408A, 408B are fed to a combiner 78, which mixes together individual packets from each stream, thereby creating a stream of resultant uncompressed speech packets 410. The resultant uncompressed speech packets 410 are fed to an encoder 80, which re-encodes the speech, resulting in compressed speech packets 406. The compressed speech packets 406 are fed to the data interface 42B, which accordingly forwards the speech packets 406 to the media gateway 26. In an alternative embodiment, the encoder 80 produces compressed speech which is packetized by the data interface 42B.

In the reverse direction of communication, essentially the same operations are performed as before. Specifically, the data received from the media gateway 26 at the data interface 42B comprises compressed speech packets 452. The data interface 42B forwards the compressed speech packets 452 to a decoder 82, which is adapted to produce uncompressed speech packets 454 (i.e., waveform data such as PCM samples). The uncompressed speech packets 454 are fed to an extractor 84, which processes the uncompressed speech packets 454 to extract auxiliary information 456 therefrom. The extracted auxiliary information can be referred to as auxiliary information. In the present example, the auxiliary information 456 includes a signal power, which can be measured from the uncompressed speech packets 454 by a signal power measurement unit forming part of the extractor 84. The auxiliary information 456 may also include a speaker tag, which identifies the end user device 16 from which the speech in the uncompressed speech packets 454 originated. This may be obtained on the basis of a source address of the compressed speech packets 452. The extractor 84 provides the auxiliary information 456 to a combiner 86, which also receives the compressed speech packets 452 from the data interface 42B. The combiner 82 combines (e.g., appends, concatenates, etc.) the auxiliary information 456 to the compressed speech packets 452 to create composite packets 458 that are fed to the data interface 42A. The data interface 42A accordingly forwards the composite speech packets 458 to the tandem-free conference bridge 30.

Those skilled in the art will of course appreciate that the concepts described herein above can be extended to situations when there are more than two active speakers. Also, the above description has assumed that each of the gateways 22, 24, 26 is adapted to receive speech from an end user device in PCM format and encode the speech into vocoder-compressed speech parameters. The typical reason for such encoding is to drastically reduce the bandwidth required to transmit human speech by representing the speech in terms of parametric data rather than waveform data. However, this need not be the case. In fact, embodiments of the invention are contemplated in which the gateways 22, 24, 26 are accustomed to sending and receiving uncompressed speech (i.e., waveform data such as PCM samples).

Accordingly, a third embodiment of the adapter 32 is shown in FIG. 3C, wherein there are again two active speakers (i.e., M=2). However, in this case, the media gateway exchanges speech in uncompressed form (e.g., PCM samples). The adapter 32 is seen to comprise a data interface 42A for exchanging data with the tandem-free conference bridge 30 and a data interface 42B for exchanging data with the media gateway 26. Specifically, the data received from the tandem-free conference bridge 30 comprises composite packets 402 containing compressed speech and auxiliary information pertaining to the compressed speech in each of the composite packets 402. In the present example, the auxiliary information includes a speaker tag indicative of a selected speaker, either "12" being indicative of end user device 12 or "14" being indicative of end user device 14. As mentioned before, the auxiliary information may include different information instead of, or in addition to, the speaker tag. The data interface 42A forwards the composite packets 402 to a processing entity 74.

Figure 3C:
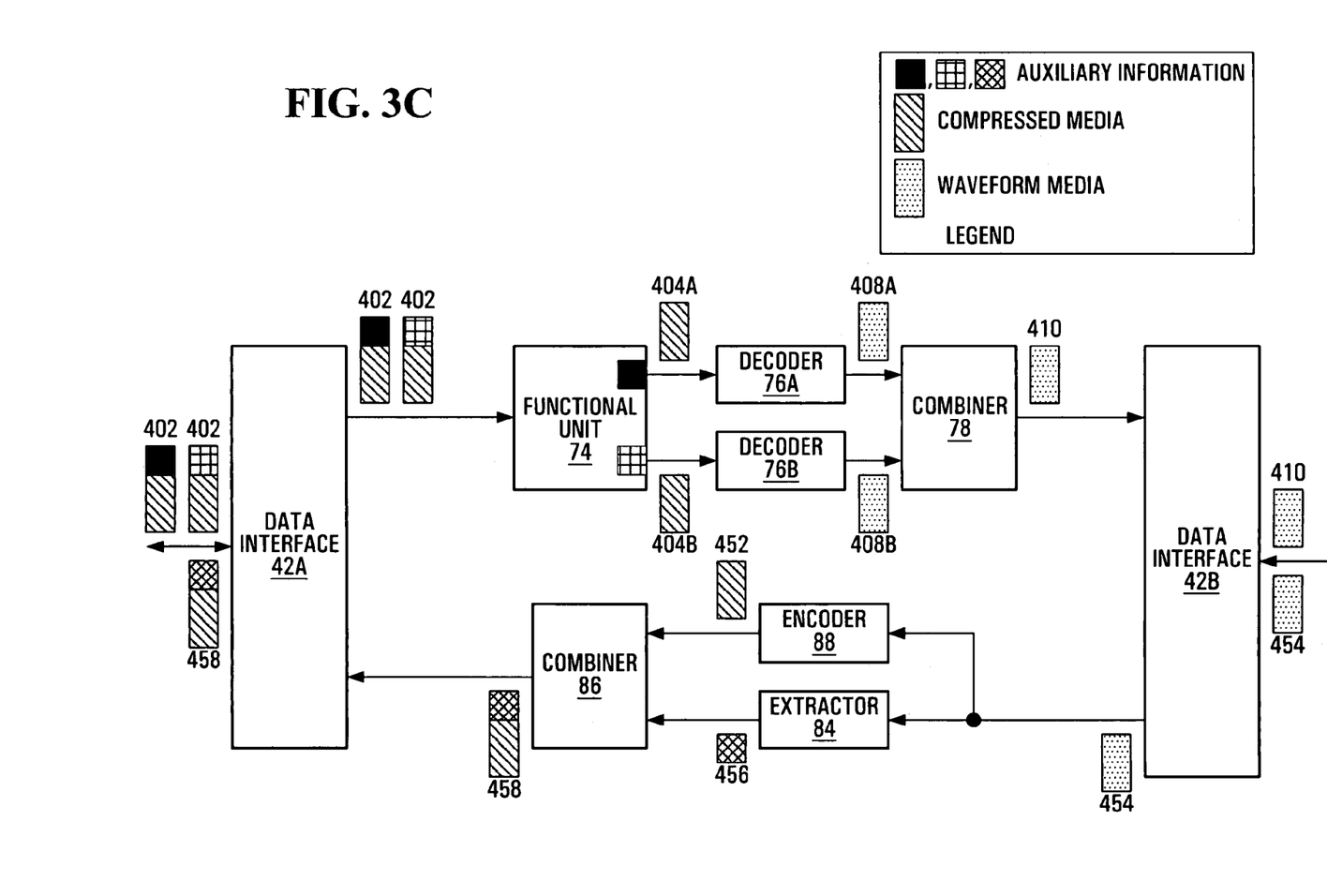

The processing entity 74 is adapted to remove the auxiliary information from the composite packets 402 and process it if necessary. In the present example, there are two active speakers, and therefore the function of the processing entity 74 may be as simple as the sorting of the composite packets 402 into one of two streams of compressed speech packets 404A, 404B, based on the speaker identified in the auxiliary information. In another embodiment, the processing entity 74 may determine a vocoder type from the auxiliary information, which may indicate that the two streams of compressed speech packets 404A, 404B have been compressed using different vocoder rates or algorithms, for example.

The two streams of compressed speech packets 404A, 404B are fed to respective decoders 76A, 76B. Decoder 76A converts the speech in the respective stream of compressed speech packets 404A into a stream of uncompressed speech packets 408A (e.g., waveform data such as PCM samples). Similarly, decoder 76B converts the speech in the respective stream of compressed speech packets 404B into a stream of uncompressed speech packets 408B (e.g., waveform data such as PCM samples). It is recalled that the processing entity 74 may indicate to each of the decoders 76A, 76B that it is to use a different rate or algorithm, for example. The uncompressed speech packets 408A, 408B are fed to a combiner 78, which mixes together individual packets from each stream, thereby creating a stream of resultant uncompressed speech packets 410. The resultant uncompressed speech packets 410 are fed to the data interface 42B, which accordingly forwards the speech packets 406 to the media gateway 26.

In the reverse direction of communication, the data received from the media gateway 26 at the data interface 42B comprises uncompressed speech packets 454. The data interface 42B forwards the uncompressed speech packets 454 to both an encoder 88 and an extractor 84. The encoder encodes the uncompressed speech packets, resulting in compressed speech packets 452, which is fed to a combiner 86. The extractor processes the uncompressed speech packets 454 to extract auxiliary information 456 therefrom. The extracted auxiliary information can be referred to as auxiliary information. In the present example, the auxiliary information 456 includes a signal power, which can be measured from the uncompressed speech packets 454 by a signal power measurement unit forming part of the extractor 84. The auxiliary information 456 may also include a speaker tag, which identifies the end user device 16 from which the speech in the uncompressed speech packets 454 originated. This may be obtained on the basis of a source address of the uncompressed speech packets 454. The extractor 84 provides the auxiliary information 456 to the combiner 86. The combiner 82 associates (e.g., appends, concatenates, etc.) the auxiliary information 456 to the compressed speech packets 452 to create composite packets 458 that are fed to the data interface 42A. The data interface 42A accordingly forwards the composite speech packets 458 to the tandem-free conference bridge 30.

One way of setting up a teleconference using the tandem-free conference bridge 30 and the adapter 32 is now described with reference again to FIG. 1. From a control plane perspective, the media gateways 22, 24, 26, the tandem-free conference bridge 30 and the adapter 32 are controlled by network elements 52, 54, 56 that act as media gateway controllers. In this specific example, media gateway controller 52 has control over media gateway 22, media gateway controller 54 has control over media gateway 54 and the tandem-free conference bridge 30, and media gateway controller 56 has control over media gateway 26 and the adapter 32.

To establish the conference, the media gateway controllers 52, 54, 56 communicate with each other using a signalling protocol. Signalling between media gateway controllers 52 and 54 will reveal that these media gateways are both compatible with the tandem-free conference bridge 30. Thus, media gateway controller 52 establishes media path 32 between media gateway 22 and the tandem-free conference bridge 30, while media gateway controller 54 establishes media path 34 between media gateway 24 and the tandem-free conference bridge 30.

However, signalling between media gateway controller 56 and either media gateway controller 52 or media gateway controller 54 will reveal that media gateway 26 is not compatible with the tandem-free conference bridge 30. Thus, media gateway controller 56 causes media path 36 to pass through adapter 32 between media gateway 26 and the tandem-free conference bridge 30. In addition, the media gateway controller 56 activates the appropriate functionality/configuration of the adapter 32, e.g., the functionality of the processing entity 74, the number of decoders 76A, 76B, the presence/absence of the decoder 82, encoder 88 and encoder 80, the presence/absence of the combiner 80, etc.

It will be apparent that the routing of media path 36 through the adapter 32 allows end user device 16 to participate in a conference with end user devices 12, 14 via the tandem-free conference bridge 30. Hence, the provision of the adapter 32 eliminates the need to retrofit existing media gateways with the ability to interface with newly available tandem-free conference bridges. Advantages also arise in those instances where it may not be possible to implement tandem-free conferencing until standards have been defined; in absence of such standards, the adapter 32 would allow the implementation of tandem-free conferencing to work with standard existing devices.

It should also be understood that the present invention imposes no limitation on the number of participants in the conference of interest, nor on the number of active speakers, nor on whether a particular media gateway that participates in the conference is compatible or incompatible with the tandem-free conference bridge 30. In the present case, the selection of media gateway 26 as being incompatible with the tandem-free conference bridge 30 has been made completely arbitrarily and by way of illustration only.

Figure 2:
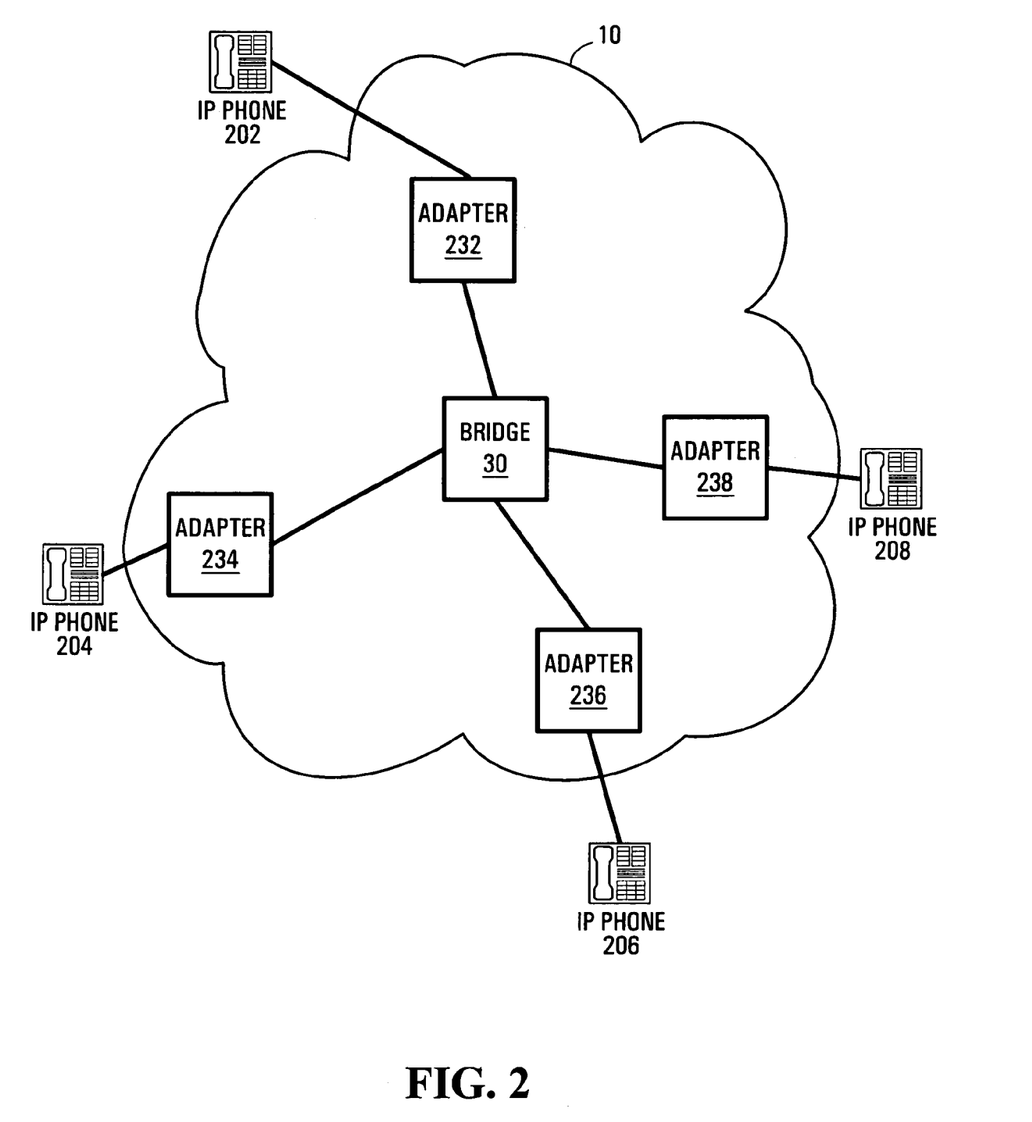
FIG. 2 is a block diagram showing a plurality of IP phones involved in a teleconference.

It is envisaged that in the scenario where the majority of the media gateways in the network 10 would be incompatible with the tandem-free conference bridge 30, a bank of adapters 32 may be made available in the network 10 so as to be used by conferees when required. For example, consider the scenario depicted in FIG. 2, where four "IP phones" 202, 204, 206, 208 are desirous of participating in a telephone conference. Each of the IP phones 202, 204, 206, 208 comprises the functionality of a telephone as well as a vocoder to exchange compressed speech with the network 10. In this sense, packet-based speech and possibly video is transmitted towards the conference bridge 30. However, the IP phones are not aware that the conference bridge 30 is a tandem-free conference bridge that exchanges composite packets, each composite packet carrying media information in conjunction with auxiliary information pertaining to the media information. It is therefore envisaged that a plurality of adapters 232, 234, 236, 238 would be located in the media paths between the respective IP phones 202, 204, 206, 208 and the tandem-free bridge 30, until such time as IP phones are upgraded to support interaction with tandem-free conference bridges.

Those skilled in the art will also appreciate that the present invention can also be applied to videoconferencing where there is provided a bridge that performs video stream selection on the basis of auxiliary information pertaining to packets in each of a plurality of compressed video streams. Therefore, the present invention is not limited to packets of compressed and uncompressed speech, but rather is applicable additionally to packets of compressed and uncompressed video and, more generally, to packets of compressed and uncompressed "media", where media includes but is not limited to one or more of speech, audio, still imagery and video.

It should also be understood that the word "packet" as used herein should be construed broadly as encompassing any datagram format, including but not limited to Internet Protocol (IP), Asynchronous Transfer Mode (ATM), Ethernet, Frame Relay, etc.

Those skilled in the art will appreciate that in some embodiments, the functionality of the adapter 32 (e.g., processing entity 74, decoders 76A, 76B, combiner 78, encoder 80, decoder 82, extractor 84, combiner 86, encoder 88) may be implemented as pre-programmed hardware or firmware elements (e.g., application specific integrated circuits (ASICs), electrically erasable programmable read-only memories (EEPROMs), etc.), or other related components. In other embodiments, the adapter 32 may be implemented as an arithmetic and logic unit (ALU) having access to a code memory (not shown) which stores program instructions for the operation of the ALU. The program instructions could be stored on a medium which is fixed, tangible and readable directly by the adapter 32, (e.g., removable diskette, CD-ROM, ROM, or fixed disk), or the program instructions could be stored remotely but transmittable to the adapter 32 via a modem or other interface device (e.g., a communications adapter) connected to a network over a transmission medium. The transmission medium may be either a tangible medium (e.g., optical or analog communications lines) or a medium implemented using wireless techniques (e.g., microwave, infrared or other transmission schemes).

While specific embodiments of the present invention have been described and illustrated, it will be apparent to those skilled in the art that numerous modifications and variations can be made without departing from the scope of the invention as defined in the appended claims.

What is claimed is:

1. A method of processing data carried on a media path between a first network element and a second network element, comprising:
   receiving a stream of composite packets from the first network element, each composite packet carrying media information and auxiliary information pertaining to the composite packet;
   generating, on a basis of the media information and the auxiliary information carried in the composite packets, an output media stream free of the auxiliary information carried in the composite packets;
   releasing the output media stream towards the second network element.

2. The method defined in claim 1, wherein generating the output media stream comprises:
   removing the auxiliary information from each composite packet.

3. The method defined in claim 2, wherein the media information carried in each composite packet comprises compressed media, wherein generating the output media stream further comprises:
   converting into waveform data the compressed media carried in each composite packet.

4. The method defined in claim 1, wherein the auxiliary information carried in each composite packet identifies an active speaker associated with the composite packet, wherein generating the output media stream comprises:
   determining from the auxiliary information carried in each composite packet an active speaker associated with the composite packet;
   generating an intermediate media stream for each of a plurality of active speakers from the media information carried in each of the composite packets associated with that active speaker;
   combining the intermediate media streams into the output media stream.

5. The method defined in claim 4, wherein the media information carried in each composite packet comprises compressed media, wherein generating an intermediate media stream for a particular active speaker comprises:
   converting into waveform data the compressed media carried in each composite packet associated with the particular active speaker.

6. The method defined in claim 5, wherein combining the intermediate media streams into the output media stream comprises:
   adding the waveform data carried in the intermediate media streams to generate the output media stream carrying composite waveform data.

7. The method defined in claim 6, the method further comprising:
   encoding into compressed media the composite waveform data carried in the output media stream.

8. The method defined in claim 1, wherein the auxiliary information carried in each composite packet identifies a codec type associated with the composite packet, wherein generating the output media stream comprises:
   determining from the auxiliary information carried in each composite packet a codec type associated with the composite packet;
   generating an intermediate media stream for each of a plurality of codec types from the media information carried in each of the composite packets associated with that active speaker;
   combining the intermediate media streams into the output media stream.

9. The method defined in claim 8, wherein the media information carried in each composite packet comprises compressed media, wherein generating an intermediate media stream for a particular codec type comprises:
   converting into waveform data the compressed media carried in each composite packet associated with the particular codec type.

10. The method defined in claim 9, wherein combining the intermediate media streams into the output media stream comprises:
    adding the waveform data carried in the intermediate media streams to generate the output media stream carrying composite waveform data.

11. The method defined in claim 10, the method further comprising:
    encoding into compressed media the composite waveform data carried in the output media stream.

12. The method defined in claim 1, wherein the media is speech.

13. The method defined in claim 1, wherein the media is audio.

14. The method defined in claim 1, wherein the media is still imagery.

15. The method defined in claim 1, wherein the media is video.

16. The method defined in claim 1, further comprising packetizing the output media stream at a data interface prior to releasing the output media stream towards the second network element.

17. Apparatus for processing data carried on a media path between a first network element and a second network element, comprising:
   means for receiving a stream of composite packets from the first network element, each composite packet carrying media information and auxiliary information pertaining to the composite packet;
   means for generating, on a basis of the media information and the auxiliary information carried in the composite packets, an output media stream free of the auxiliary information carried in the composite packets;
   means for releasing the output media stream towards the second network element.

18. An apparatus for processing data carried on a media path between a first network element and a second network element, comprising:
   a data interface operative to receive a stream of composite packets from the first network element and to release an output media stream towards the second network element, each composite packet carrying media information and auxiliary information pertaining to the composite packet;
   a processing entity operative to generate, on a basis of the media information and the auxiliary information carried in the composite packets, the output media stream free of the auxiliary information carried in the composite packets.

19. The apparatus defined in claim 18, wherein the processing entity being operative to generate the output media stream comprises the processing entity being operative to remove the auxiliary information from each composite packet.

20. The apparatus defined in claim 19, wherein the media information carried in each composite packet comprises compressed media, further comprising a decoder operative to decode into waveform data the compressed media carried in each composite packet.

21. The apparatus defined in claim 18, wherein the auxiliary information carried in each composite packet identifies an active speaker associated with the composite packet, wherein the processing entity being operative to generate the output media stream comprises the processing entity being operative to determine from the auxiliary information carried in each composite packet an active speaker associated with the composite packet and to generate an intermediate media stream for each of a plurality of active speakers from the media information carried in each of the composite packets associated with that active speaker, the apparatus further comprising:
   a combiner operative to combine the intermediate media streams into the output media stream.

22. The apparatus defined in claim 21, wherein the media information carried in each composite packet comprises compressed media, further comprising:
   for each particular active speaker, a decoder operative to decode into waveform data the compressed media carried in each composite packet associated with the particular active speaker.

23. The apparatus defined in claim 22 wherein the combiner being operative to combine the intermediate media streams into the output media stream comprises the combiner being operative to add the waveform data carried in the intermediate media streams to generate the output media stream carrying composite waveform data.

24. The apparatus defined in claim 23, further comprising:
   an encoder operative to encode into compressed media the composite waveform data carried in the output media stream.

25. The apparatus defined in claim 18, wherein the auxiliary information carried in each composite packet identifies a codec type associated with the composite packet, wherein the processing entity being operative to generate the output media stream comprises the processing entity being operative to determine from the auxiliary information carried in each composite packet a codec type associated with the composite packet and to generate an intermediate media stream for each of a plurality of codec types from the media information carried in each of the composite packets associated with that active speaker, the apparatus further comprising:
   a combiner operative to combine the intermediate media streams into the output media stream.

26. The apparatus defined in claim 25, wherein the media information carried in each composite packet comprises compressed media, the apparatus further comprising:
   for each particular codec type, a decoder operative to decode into waveform data the compressed media carried in each composite packet associated with the particular codec type.

27. The apparatus defined in claim 26, wherein the combiner being operative to combine the intermediate media streams into the output media stream comprises the combiner being operative to add the waveform data carried in the intermediate media streams to generate the output media stream carrying composite waveform data.

28. The apparatus defined in claim 27, further comprising:
   an encoder operative to encode into compressed media the composite waveform data carried in the output media stream.

29. The apparatus defined in claim 18, the data interface being further operative to packetize the output media stream at a data interface prior to releasing the output media stream towards the second network element.

30. A method of processing data carried on a media path between a first network element and a second network element, comprising:
   receiving a stream of packets from the first network element, each received packet carrying media information;
   deriving from the media information carried in each received packet auxiliary information pertaining to the received packet;
   generating a stream of composite packets, each said composite packet being produced from the media information carried in a respective received packet and the auxiliary information pertaining to the respective received packet;
   releasing the stream of composite packets towards the second network element.

31. The method defined in claim 30, wherein deriving from the media information in each received packet the auxiliary information pertaining to the received packet comprises:
   determining an identity of an end user device from which the received packet originates.

32. The method defined in claim 31, wherein the media information carried in each received packet comprises compressed media, the method further comprising:

producing each composite packet by associating to the compressed media carried in a respective received packet the auxiliary information pertaining to the respective received packet.

33. The method defined in claim 32, wherein deriving from the media information in each received packet the auxiliary information pertaining to the received packet comprises:
converting into waveform data the compressed media carried in the received packet;
identifying at least one feature of the waveform data.

34. The method defined in claim 33, wherein the at least one feature includes information useful by a conference bridge in making an active talker selection.

35. The method defined in claim 34, wherein the at least one feature includes a signal power of the waveform data.

36. The method defined in claim 32, wherein deriving from the media information in each received packet the auxiliary information pertaining to the received packet comprises:
determining an identity of an end user device from which the received packet originates.

37. The method defined in claim 30, wherein the media information carried in each received packet comprises waveform data, wherein deriving from the media information in each received packet the auxiliary information pertaining to the received packet comprises encoding into compressed media the waveform data carried in the received packet, the method further comprising:
producing each composite packet by associating to the compressed media encoded from the waveform data carried in a respective received packet the auxiliary information pertaining to the respective received packet.

38. The method defined in claim 37, wherein deriving from the media information in each received packet the auxiliary information pertaining to the received packet comprises:
identifying at least one feature of the waveform data carried in each packet.

39. The method defined in claim 38, wherein the at least one feature includes information useful by a conference bridge in making an active talker selection.

40. The method defined in claim 39, wherein the at least one feature includes a signal power of the waveform data.

41. The method defined in claim 37, wherein deriving from the media information in each received packet the auxiliary information pertaining to the received packet comprises:
determining an identity of an end user device from which the received packet originates.

42. The method defined in claim 30, wherein the media is speech.

43. The method defined in claim 30, wherein the media is audio.

44. The method defined in claim 30, wherein the media is still imagery.

45. The method defined in claim 30, wherein the media is video.

46. Apparatus for processing data carried on a media path between a first network element and a second network element, comprising:
means for receiving a stream of packets from the first network element, each received packet carrying media information;
means for deriving from the media information carried in each received packet auxiliary information pertaining to the received packet;
means for generating a stream of composite packets, each said composite packet being produced from the media information carried in a respective received packet and the auxiliary information pertaining to the respective received packet;
means for releasing the stream of composite packets towards the second network element.

47. Apparatus for processing data carried on a media path between a first network element and a second network element, comprising:
a data interface operative to receive a stream of packets from the first network element and to release a stream of composite packets towards the second network element, each received packet carrying media information;
a processing entity operative to derive from the media information carried in each received packet auxiliary information pertaining to the received packet;
a combiner operative to produce each composite packet by combining the media information carried in a respective received packet and the auxiliary information pertaining to the respective received packet.

48. The apparatus defined in claim 47, wherein the media information carried in each received packet comprises compressed media, wherein the combiner being operative to produce each composite packet comprises the combiner being operative to associate to the compressed media carried in the respective received packet the auxiliary information pertaining to the respective received packet.

49. The apparatus defined in claim 48, wherein the processing entity comprises:
a decoder operative to decode into waveform data the compressed media carried in the received packet; and
a feature extractor operative to identify at least one feature of the waveform data.

50. The apparatus defined in claim 49, wherein the at least one feature includes information useful by a conference bridge in making an active talker selection.

51. The apparatus defined in claim 50, wherein the feature extractor is a signal power measurement unit operative to measure a signal power of the waveform data.

52. The apparatus defined in claim 51, wherein the media information carried in each received packet comprises waveform data, wherein the processing entity comprises an encoder operative to encode into compressed media the waveform data carried in the received packet. wherein the combiner being operative to produce each composite packet comprises the combiner being operative to associate to the compressed media encoded from the waveform data carried in the respective received packet the auxiliary information pertaining to the respective received packet.

53. The apparatus defined in claim 52, wherein the processing entity comprises:
a feature extractor operative to identify at least one feature of the waveform data carried in each packet.

54. The apparatus defined in claim 53, wherein the at least one feature includes information useful by a conference bridge in making an active talker selection.

55. The apparatus defined in claim 54, wherein the feature extractor is a signal power measurement unit operative to measure a signal power of the waveform data.

56. A method of processing data carried on a media path between a first network element and a second network element, comprising:
receiving a stream of packets from the first network element, each received packet carrying media information, wherein the media information carried in each received packet comprises compressed media;

deriving from the media information carried in each received packet auxiliary information pertaining to the received packet, wherein said deriving comprises:

determining an identity of an end user device from which the received packet originates;

converting into waveform data the compressed media carried in the received packet; and identifying at least one feature of the waveform data, wherein the at least one feature includes information useful by a conference bridge in making an active talker selection;

generating a stream of composite packets, each said composite packet being produced from the media information carried in a respective received packet and the auxiliary information pertaining to the respective received packet;

releasing the stream of composite packets towards the second network element; and producing each composite packet by associating to the compressed media carried in a respective received packet the auxiliary information pertaining to the respective received packet.

57. A method of processing data carried on a media path between a first network element and a second network element, comprising:

receiving a stream of packets from the first network element, each received packet carrying media information, wherein the media information carried in each received packet comprises waveform data;

deriving from the media information carried in each received packet auxiliary information pertaining to the received packet, wherein said deriving comprises encoding into compressed media the waveform data carried in the received packet and identifying at least one feature of the waveform data carried in each packet, wherein the at least one feature includes information useful by a conference bridge in making an active talker selection;

generating a stream of composite packets, each said composite packet being produced from the media information carried in a respective received packet and the auxiliary information pertaining to the respective received packet by associating to the compressed media encoded from the waveform data carried in a respective received packet the auxiliary information pertaining to the respective received packet; and releasing the stream of composite packets towards the second network element.

58. Apparatus for processing data carried on a media path between a first network element and a second network element, comprising:

a data interface operative to receive a stream of packets from the first network element and to release a stream of composite packets towards the second network element, each received packet carrying media information, wherein the media information carried in each received packet comprises compressed media:

a processing entity operative to derive from the media information carried in each received packet auxiliary information pertaining to the received packet, wherein the processing entity comprises:

a decoder operative to decode into waveform data the compressed media carried in the received packet; and a feature extractor operative to identify at least one feature of the waveform data, wherein the at least one feature includes information useful by a conference bridge in making an active talker selection; and a combiner operative to produce each composite packet by combining the media information carried in a respective received packet and the auxiliary information pertaining to the respective received packet so as to associate to the compressed media carried in the respective received packet the auxiliary information pertaining to the respective received packet.

* * * * *

UNITED STATES PATENT AND TRADEMARK OFFICE
CERTIFICATE OF CORRECTION

PATENT NO. : 7,619,994 B2
APPLICATION NO. : 10/721909
DATED : November 17, 2009
INVENTOR(S) : Rafi Rabipour et al.

It is certified that error appears in the above-identified patent and that said Letters Patent is hereby corrected as shown below:

Title Page;

(12) Correct the typographical error in the name of the first inventor, Rafi RABIPOUR;

(75) Correct the typographical error in the name of the first inventor, Rafi RABIPOUR.

Signed and Sealed this

Sixteenth Day of February, 2010

David J. Kappos
*Director of the United States Patent and Trademark Office*